United States Patent [19]

Sim

[11] Patent Number: 5,709,963

[45] Date of Patent: Jan. 20, 1998

[54] BATTERY PACK

[75] Inventor: Jae-Hoon Sim, Seoul, Rep. of Korea

[73] Assignee: Daewoo Electronics Co., Inc., Seoul, Rep. of Korea

[21] Appl. No.: 684,885

[22] Filed: Jul. 25, 1996

[51] Int. Cl.$^6$ .................................................. H01M 2/10
[52] U.S. Cl. ........................... 429/99; 429/100; 429/159
[58] Field of Search ........................... 429/96, 99, 100, 429/159

[56] References Cited

U.S. PATENT DOCUMENTS 4,965,148   10/1990   Daio et al. ............................. 429/159
4,997,731   3/1991    Machida ................................ 429/90

FOREIGN PATENT DOCUMENTS 61-39861   3/1986   Japan .
5-35562    2/1993   Japan .
5-35562    9/1993   Japan .

*Primary Examiner*—Stephen Kalafut
*Assistant Examiner*—Jonathan S. Krueger
*Attorney, Agent, or Firm*—Foley & Lardner

[57] ABSTRACT

A battery pack is disclosed, in which terminal members can be fixed to cases, and which its entire volume can be reduced. The battery pack comprises a pair of battery cells electrically connected in series to each other, a pair of cases receiving the battery cells and including a lid, a cell receiving portion, and a connecting portion respectively, and a pair of terminal members connected to electrodes of the battery cells and fixed to a case so that they are externally exposed. According to the battery pack, as the battery cells are received so as to be exposed outside the cases, its total volume can be reduced. In addition, it has another advantage of fixing the terminal members to the cases positively and easily.

6 Claims, 4 Drawing Sheets

BATTERY PACK

BACKGROUND OF THE INVENTION

1. Field of the Invention

The present invention relates to a battery pack, and more particularly to a battery pack which can be used as an electric power source for a portable device, especially as an electric power source for a camera.

2. Prior Art

An example of a battery pack used as an electric power source for a portable device such as a camera, a portable video camera, or the like is disclosed in Japanese Utility Model Laid-Open Publication No. 61-39861. The battery pack includes a pair of cases engaged with each other, thus forming an inner space, a pair of battery cells which is provided in the space formed by the cases and electrically connected to each other, and two terminal members exposed outside the cases, the ends of which are connected to the positive and negative electrodes of the battery cells, respectively.

In the above battery pack, the terminal members are exposed on both cross sectional and side surfaces of the cases so that the terminal members are easily connected to the device. Also, the deformation of the terminal members by the external impact is solved by forming supporting plates within openings of the battery pack.

However, because the ends of terminal members are not sufficiently inserted into the recesses formed at the inner sides of the openings, the terminal members may be in a loose and/or mismatching state. Further, when the other ends of the terminal members are electrically connected to the electrodes of the battery cells by welding, the terminal members become higher than the recesses due to a response to the welding pressure. Thus, the appearance of the battery pack is poor.

A battery pack which can overcome the above-mentioned disadvantages, for example, is disclosed in Japanese Utility Model Publication No. 5-35562.

A battery pack 10 of the above publication, as shown in FIGS. 1 through 3, includes a pair of battery cells 12 which are electrically connected in series to each other, a pair of terminal members 16 respectively connected to positive and negative electrodes 14 of battery cells 12, a pair of cases 18 and 20 which form a space for receiving battery cells 12, and to which terminal members 16 are fixed.

As shown in FIGS. 1, 3, and 4, terminal members 16 penetrate openings 22 formed at the side surface of the upper portion of a case 18 and are supported by reverse L-shaped supports 24 which are formed at the upper portion of case 18. Further, terminal members 16 are fixed to the cases 18 and 20 by engaging case 18 with case 20. According to the above Japanese Utility Model Publication, the ends of terminal members 16 are supported by the reverse L-shaped supports 24 formed from the side to ends of cases 18 and 20, and are fixed to cases 18 and 20 by inserting the other ends of terminal members 16 into the recesses formed on the inner side of the cross section of case 20.

However, in the above battery pack 10, since terminal members 16 are fixed to cases 18 and 20 only through the engagement of cases 18 and 20, great attention is necessary during the assembling process. In addition, since the battery cells 12 are enclosed within the inner space formed by cases 18 and 20, the volume of the battery pack 10 is much greater than the total that of battery cells 12.

In U.S. Pat. No. 4,997,731 issued to Machida et. al. on Mar. 5, 1991, a battery pack wherein the cases and lids are manufactured separately is disclosed. According to the battery pack of Machida et al., the battery cells are placed in the space formed by a pair of cases and are electrically connected to each other by using a connecting piece. Then, the end openings of the cases are closed after the terminal members are fixed to the positive and negative electrodes of the battery cells. However, according to the battery pack of Machida et al., since the cases and lids should be manufactured separately, a lot of the manufacturing steps are needed. In addition, since the battery cells are placed on the lower lid, they might be released from the battery pack by an unintentional separation of the lower lid from the cases.

SUMMARY OF THE INVENTION

Therefore, it is an object of the present invention to provide a battery pack having a small volume which may be easily manufactured.

To accomplish the object of the present invention, the present invention provides a battery pack comprising:

a first case including a first lid, a first cell receiving portion for receiving and supporting first and second battery cells, and a first connecting portion for connecting the first cell receiving portion with the first lid, wherein the first and second battery cells are arranged in parallel and electrically connected in series to each other, the first lid includes a pair of first apertures formed on an outer side surface thereof, a pair of second apertures formed at an upper surface thereof, and a pair of terminal member supporting portions which are shaped like recesses to connect the first apertures and the second apertures to each other, and the first lid, the first cell receiving portion, and the first connecting portion are integrally formed;

a second case including a second lid engaged with the first lid, a second cell receiving portion for receiving and supporting the first and second battery cells by engagement with the first cell receiving portion, and a second connecting portion for connecting the second cell receiving portion with the second lid, wherein the second lid, the second cell receiving portion, and the second connecting portion are integrally formed; and a first and second terminal members, each having a connecting end which is inserted through one of the first apertures of the first case so that they are fixed to the first case, and a fixing end which is inserted through one of the second aperture so that it is electrically connected with one of electrodes of the first and second battery cells, wherein the first and second terminal members are located on the terminal member supporting portions.

According to the present invention, the first and second battery cells are electrically connected in series to each other through a connecting sheet. The fixing ends of the first and second terminal members are inserted through the second apertures of the first lid so that they are fixed at the inner surface of the first lid, and the connecting ends are inserted through the first apertures.

Then, the first and second battery cells, which are electrically connected in series to each other by the connecting piece, are placed on the first cell receiving portion of the first case. The second case is engaged with the first case after the connecting ends of the first and second terminal members are fixed to the electrodes Of the battery cells respectively by welding or the like.

According to the present invention, the terminal members are fixed to the cases firmly and easily. In addition, the entire volume of a battery pack can be reduced by eliminating unnecessary portions of the cases.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENTS

Figure 1:
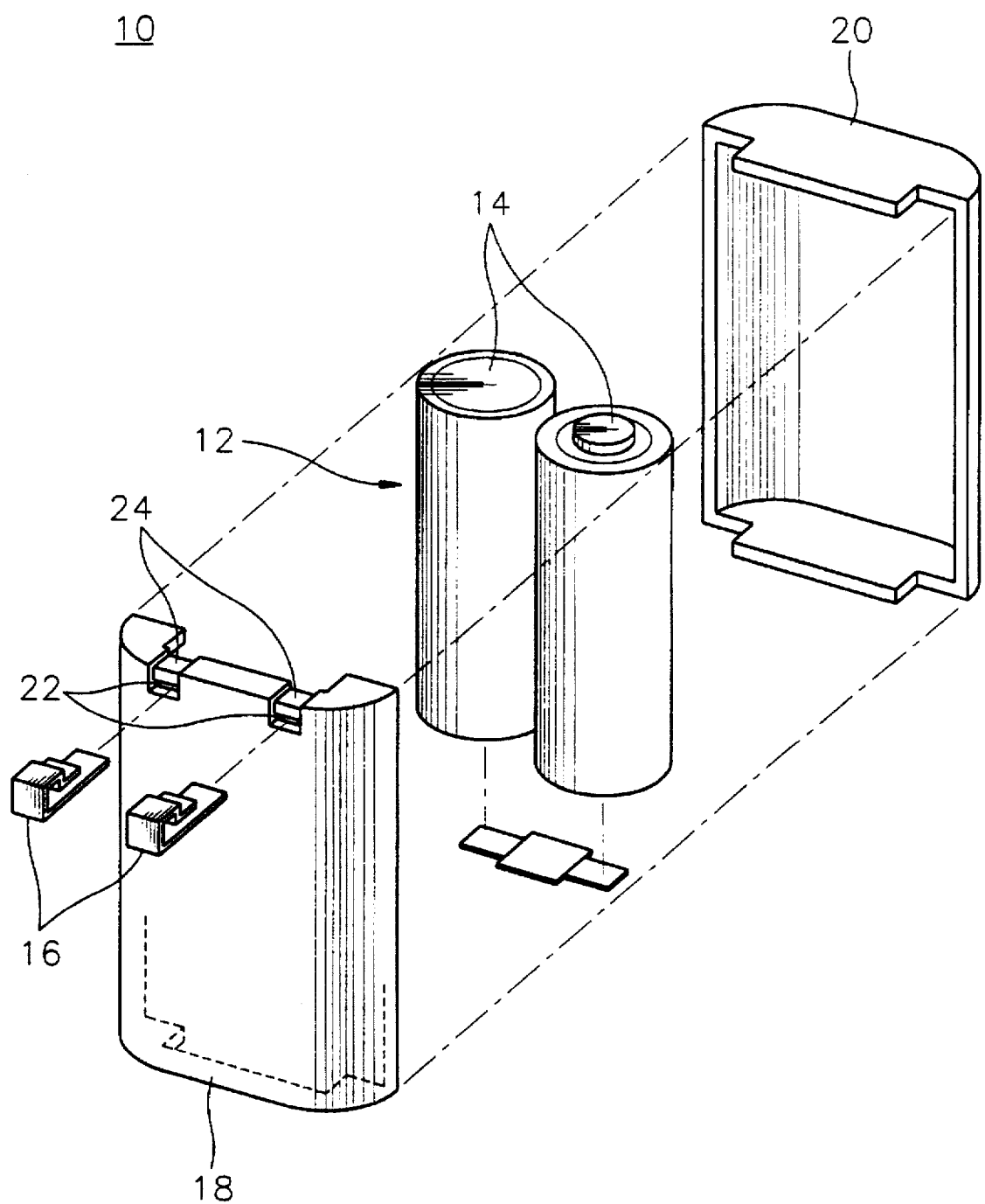
FIG. 1 is an exploded perspective view of a conventional battery pack.
Figure 2:
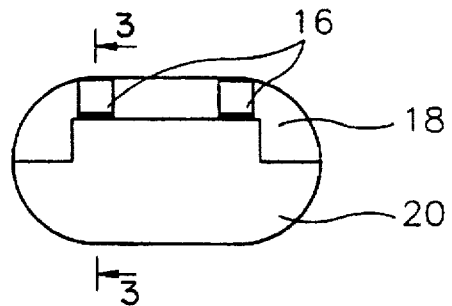
FIG. 2 is a plan view of the battery pack of FIG. 1.
Figure 3:
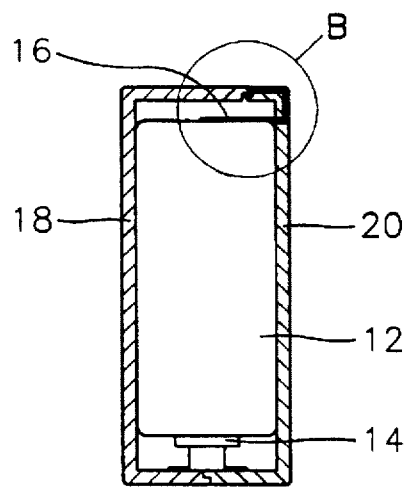
FIG. 3 is a cross sectional view taken along the line 3—3 of FIG. 2.
Figure 4:
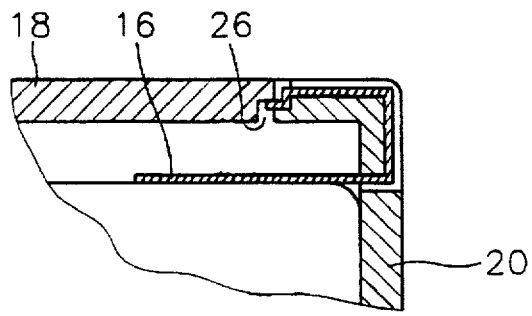
FIG. 4 is an enlarged cross sectional view of B of FIG. 3.

Hereinafter, a preferred embodiment of the present invention will be described in detail with reference to accompanying drawings, in which the same reference numerals represent the same elements.

FIGS. 5 to 8 show a battery pack 100 according to an embodiment of the present invention.

Figure 5:
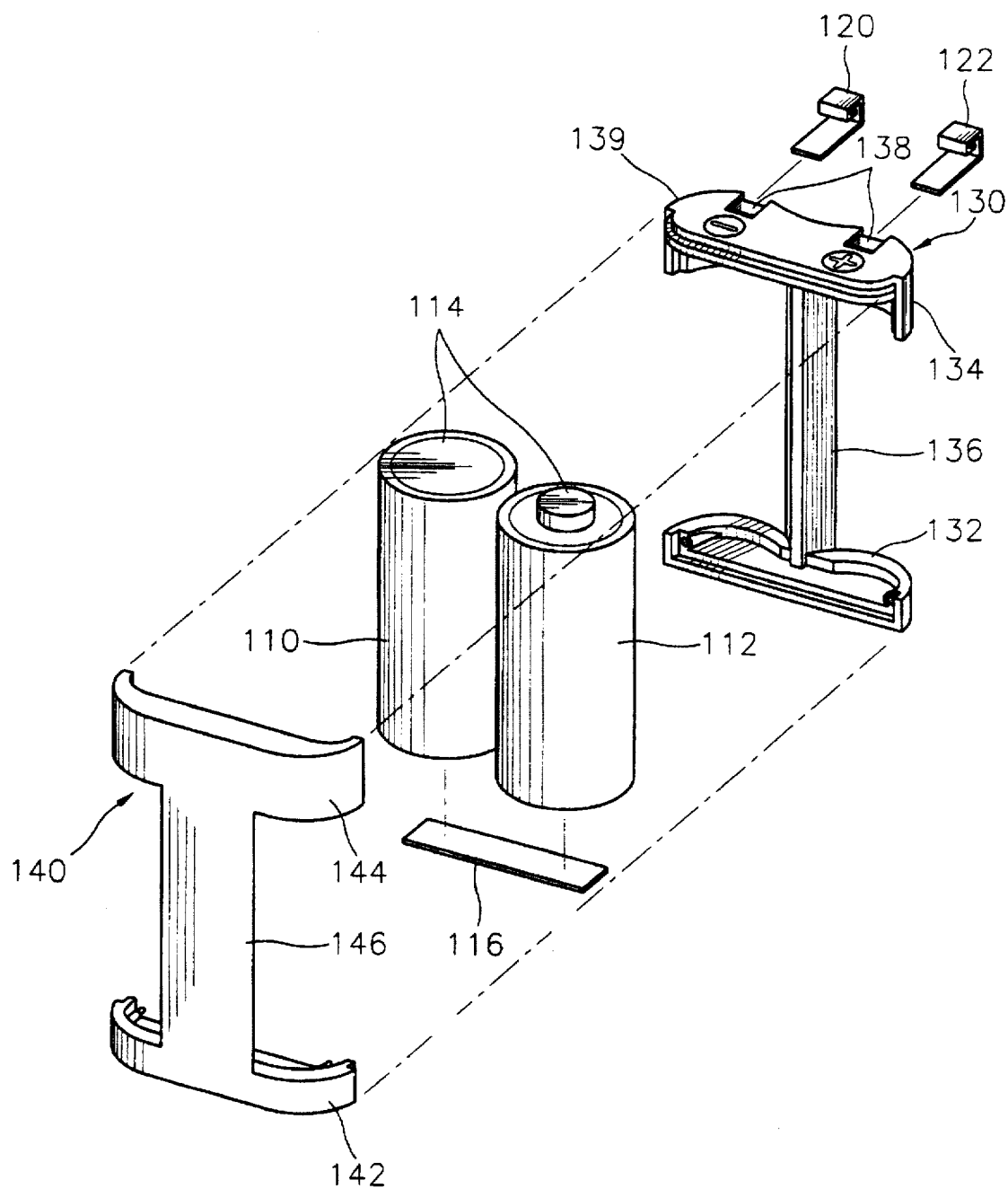
FIG. 5 is an exploded perspective view of the battery pack of an embodiment of the present invention.

As shown in FIG. 5, a battery pack 100 of an embodiment of the present invention includes first and second battery cells 110 and 112 which are arranged in parallel and electrically connected in series to each other, first and second terminal members 120 and 122 electrically connected to electrodes 114 of first and second battery cells 110 and 112 respectively, a first case 130 to which first and second terminal members 120 and 122 are integrally fixed, and a second case 140 which is engaged with first case 130 and is integrally formed, thus receiving first and second battery cells 110 and 112.

As shown in FIG. 5, first and second battery cells 110 and 112 are arranged in parallel so that opposite electrodes 114 of first and second battery cells 110 and 112 are side by side, and electrodes 114 are electrically connected in series to each other. For example, the positive electrode of first battery cell 110 is electrically connected in series to the negative electrode of second battery cell 112 by a connecting piece 116 and vice versa.

First and second terminal members 120 and 122, which have a U-like shape as shown in FIG. 5, include connecting ends 121 and 123 respectively connected to the electrodes of first and second battery cells 110 and 112, and fixing ends 124 and 125 fixed to first case 130.

Figure 6:
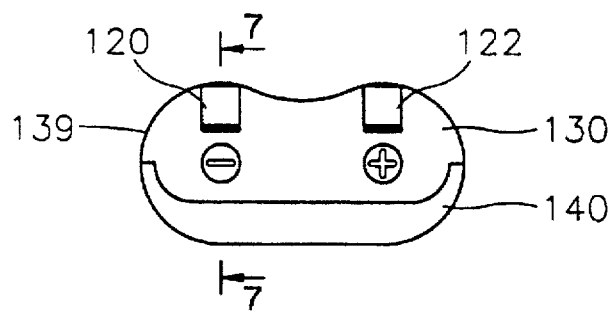
FIG. 6 is a plan view of the battery pack of FIG. 5.
Figure 7:
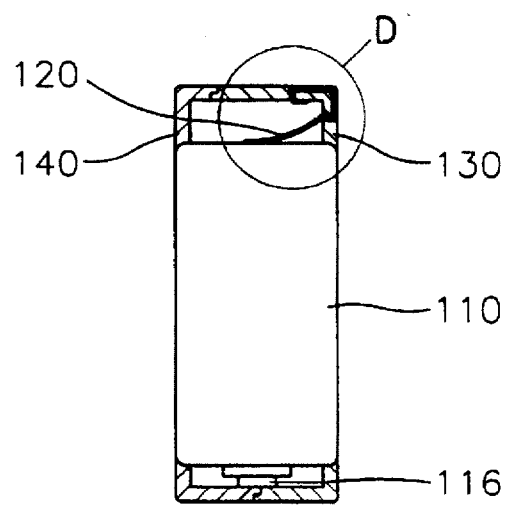
FIG. 7 is a cross sectional view taken along the line 7—7 of FIG. 6.
Figure 8:
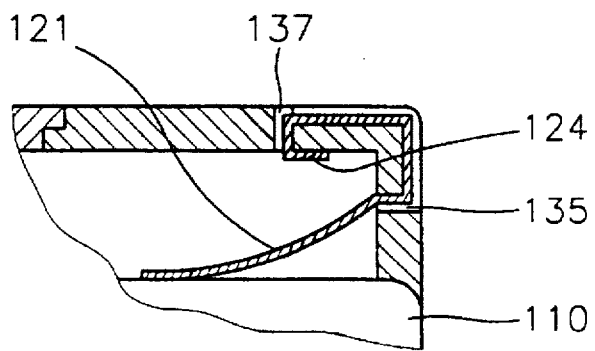
FIG. 8 is an enlarged cross sectional view of part D of FIG. 7

Fixing ends 124 and 125 are bent several times, thus having an U-like shape. First case 130, having a W-like planar shape as shown in FIG. 6, includes a first cell receiving portion 132 for receiving and supporting first and second battery cells 110 and 112, a first lid 134 to which first and second terminal members 120 and 122 are fixed, and a first connecting portion 136 for connecting first cell receiving portion 132 with first lid 134.

First apertures and second apertures 135 and 137 are formed on the side and upper surface of first lid 134, respectively. Terminal member supporting portions 138 are recesses and are formed so as to connect first and second apertures 135 and 137 to each other.

Fixing ends 124 and 125 of first and second terminal members 120 and 122 are inserted into second apertures 137, and connecting ends 121 and 123 thereof are inserted into first apertures 137 so that they are connected with the positive and negative electrodes of first and second battery cells 110 and 112. Thus, first and second terminal members 120 and 122 are placed on terminal member supporting portions 138.

First lid 134 is formed so that the radius of curvature of arcuate portions 139 thereof is equal to the radius of first and second battery cells 110 and 112. First connecting portion 136 is formed so that the radius of curvature of the outer surface thereof is equal to that of concaved portion between terminal member supporting portions 138 of first lid 134.

Second case 140 includes a second cell receiving portion 142 for receiving and supporting first and second battery cells 110 and 112 by engagement with first cell receiving portion 132, a second lid 144 engaged with first lid 134, and a second connecting portion 146 for connecting second cell receiving portion 142 with second lid 144. Arcuate portions 139 of second lid 144 are formed so that the curvature of arcuate portions 139 is equal to that of first and second battery cells 110 and 112. Also, second connecting portion 146 is formed so that outer surface thereof is a plane, and covers the concaved portion between first and second battery cells 110 and 112.

Therefore, battery pack 100 of an embodiment of the present invention has a plan view as shown in FIG. 6.

A procedure for assembling of battery pack 100 of an embodiment of the present embodiment is as follows.

First and second battery cells 110 and 112 are arranged in parallel so that opposite electrodes 114 thereof are side by side, and then are connected in series to each other through connecting piece 116. Fixing ends 124 and 125 of first and second terminal members 120 and 122 are inserted into second apertures 137 and then are bent toward the inner surface of first lid 134 so that they are fixed, and connecting ends 121 and 123 are inserted into first apertures 137.

Then, first and second battery cells 110 and 112 are connected by connecting piece 116, and are placed on first cell receiving portion 132. First and second cases 130 and 140 are engaged with each other after connecting ends 121 and 123 of first and second terminal members 120 and 122 are fixed to first and second electrodes 114 of first and second battery cells 110 and 112 by welding or the like.

Therefore, the outer surfaces of battery cells 110 and 112 received in the cases 130 and 140 are externally exposed.

As described in the embodiment, in the battery pack according to the present invention, the terminal members can be easily fixed to the cases, which can be ensured. In addition, the volume of the battery pack can be reduced by removing unnecessary portions of the conventional battery pack.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A battery pack comprising:
    a first case including a first lid, a first cell receiving portion for receiving and supporting first and second battery cells each having electrodes, and a first connecting portion for connecting the first cell receiving portion with said first lid, said first and second battery cells being physically arranged in parallel and connected electrically in series to each other, said first lid including a pair of first apertures formed on an outer side surface thereof, a pair of second apertures formed at an upper surface thereof, and a pair of terminal member supporting portions shaped like recesses to connect the first apertures and the second apertures to each other, and said first lid, the first cell receiving portion, and the first connecting portion being integrally formed;

a second case including a second lid engaged with said first lid, a second cell receiving portion for receiving and supporting said first and second battery cells by engagement with the first cell receiving portion, and a second connecting portion for connecting the second cell receiving portion with said second lid, said second lid, the second cell receiving portion, and the second connecting portion being integrally formed; and first and second terminal members, each having a connecting end inserted through one of the first apertures of said first case so that each connecting end is fixed to said first case, and a fixing end inserted through one of the second apertures so that each fixing end is electrically connected with one of said electrodes of said first and second battery cells, said first and second terminal members being located on the terminal member supporting portions, and the fixing end of said first and second terminal members being inserted through the second apertures and being bent towards an interior of said first case so that said first and second terminal members are fixed to said first case.

2. A battery pack according to claim 1, wherein the fixing ends of said first and second terminal members are each bent into a U-like shape.

3. A battery pack according to claim 1, wherein said first case has a planar W-like shape, and said first and second cases cover a space between said first and second battery cells and expose external side surface portions of said first and second battery cells.

4. A battery pack according to claim 3, wherein a radius of a curvature of arcuate portions of said first and second lids and the first and second cell receiving portions is equal to a radius of said first and second battery cells, outside and inside surfaces of the first connecting portion being concaved and convexed respectively, and outside and inside of the second connecting portion being planar and convexed respectively.

5. A battery pack comprising:

a first case including a first lid, a first cell receiving portion for receiving and supporting first and second battery cells each having electrodes, and a first connecting portion for connecting the first cell receiving portion with said first lid, said first and second battery cells being arranged physically in parallel and connected electrically in series to each other, said first lid including a pair of first apertures formed on an outer side surface thereof, a pair of second apertures formed at an upper surface thereof, and a pair of terminal member supporting portions shaped like recesses to connect the first apertures and the second apertures to each other, said first lid, the first cell receiving portion, and the first connecting portion being integrally formed, and said first case having a planar W-like shape;

a second case including a second lid engaged with said first lid, a second cell receiving portion for receiving and supporting said first and second battery cells by engagement with the first cell receiving portion, and a second connecting portion for connecting the second cell receiving portion with said second lid, said second lid, the second cell receiving portion, and the second connecting portion being integrally formed, said first and second cases covering a space between said first and second battery cells and exposing external side surface portions of said first and second battery cells; and first and second terminal members, each having a connecting end inserted through one of the first apertures of said first case so that each connecting end is fixed to said first case, and a fixing end inserted through one of the second apertures so that each fixing end is electrically connected with one of said electrodes of said first and second battery cells, said first and second terminal members being located on the terminal member supporting portions and the fixing end of said first and second terminal members being inserted through the second apertures and being bent towards an interior of said first case so that said first and second terminal members are fixed to said first case.

6. A battery pack according to claim 5, wherein the fixing ends of said first and second terminal members are each bent into a U-like shape.

* * * * *